United States Patent [19]
Ormond

[11] 3,968,676
[45] July 13, 1976

[54] MECHANICAL EQUALIZATION OF STRAIN GAUGE SENSITIVITY

[76] Inventor: Alfred Newman Ormond, 11969 E. Rivera Road, Santa Fe Springs, Calif. 90670

[22] Filed: Mar. 24, 1975

[21] Appl. No.: 561,108

[52] U.S. Cl. .............................. 73/1 B; 73/141 A
[51] Int. Cl.² .................... G01L 1/22; G01L 25/00
[58] Field of Search ............ 73/1 B, 141 A, 88.5 R, 73/133; 177/164, 211

[56] References Cited
UNITED STATES PATENTS
3,894,593  7/1975  Hall et al. ........................... 177/164

*Primary Examiner*—James J. Gill
*Attorney, Agent, or Firm*—Ralph B. Pastoriza

[57] ABSTRACT

The sensitivity of two or more load elements and associated strain gauges supporting a platform are equalized by the progressive removal of material at a location which essentially changes the rigidity of the securement of one of the load elements and its associated strain gauges until equalization results. By making the sensitivities of all of the load elements and their associated strain gauges the same, the output signal reading indicating a load will be the same for center and off-center positions of the load on the platform.

5 Claims, 6 Drawing Figures

MECHANICAL EQUALIZATION OF STRAIN GAUGE SENSITIVITY

This invention relates to a novel method of effecting mechanical equalization of strain gauge sensitivity to adjust for off-center loading on a platform supported by two or more load elements to which strain gauges are secured.

BACKGROUND OF THE INVENTION

Utilizing load elements to which strain gauges are attached for supporting a platform such as might be used as a weighing scale are well known in the art although for many applications, they have not been wholly accepted. In certain heavy duty applications such as truck weighing or thrust measurements, load elements with attached strain gauges are sometimes the only practical means of providing an indication of the forces involved. In various other better known applications such as postage weighing scales, meat counter scales and the like wherein the loads are much lighter problems have arisen primarily as a result of off-center loading on the platform of the object to be weighed.

Improved design of the load elements as well as the associated strain gauges wherein means are included which will isolate the load element and strain gauges from extraneous forces such as undesirable moments and side forces created by an off-center loading have been proposed.

While effective isolation of undesired moments and side forces from off-center loading can be achieved, the primary and most troublesome problem in weighing scales incorporating load elements and strain gauges is the fact that the sensitivities of each of the load elements and their associated strain gauges are not equal. Even though the load element itself, either in the form of a column or bending web or even a shear plate may be made identically to each other for supporting the weighing platform at various locations and even though the strain gauges themselves can be manufactured within fairly close tolerances, when the device is completely assembled, more often than not the actual output signal from the electrical bridge incorporating the strain gauges changes when the load is shifted to different off-center positions.

With respect to the foregoing, it should be understood that the output signal is directly proportional to the applied load but the slope of the output signal which constitutes a measure of the sentivity will more often than not be different when the position of the load is shifted. If there were some means of equalizing the slope of the output signal for all positions of the load or force, then errors as a consequence of off-center loading on the platform resulting from different sensitivities of the supporting load elements would be wholly eliminated.

BRIEF DESCRIPTION OF THE PRESENT INVENTION

With the foregoing in mind, the present invention contemplates a method of mechanically equalizing the strain gauge sensitivities of at least two and more usually a plurality of load elements to which strain gauges have been secured so that the final output signal from the electrical bridge incorporating the strain gauges will remain the same for all positions of the applied load or force on the platform.

Essentially, the method involves the steps of comparing the output signal from the strain gauge bridge when the applied load is positioned off-center adjacent to one element to the output signal when positioned off-center adjacent to the other element. Thereafter material is progressively physically removed from one element to change its physical rigidity under the given load until the measured output sensitivity is equal in each of the various positions of the load.

The progressive material removal in essence changes the rigidity or the degree of fixity.

BRIEF DESCRIPTION OF THE DRAWINGS

A better understanding of the method of this invention will be had by referring to the accompanying drawings in which.

DETAILED DESCRIPTION OF THE INVENTION

Figure 1:
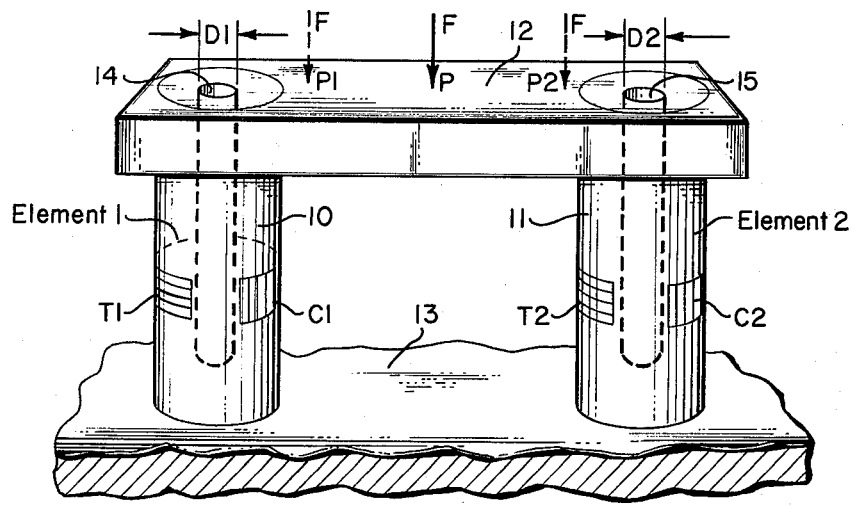
FIG. 1 is a simplified perspective view of a platform and column-type load element supports to which the method of the present invention is applicable.

Referring first to FIG. 1 there are shown two load elements in the form of columns 10 and 11 supporting a platform 12 to which a load or weight F might be applied. The load elements at their lower ends are secured to a rigid frame 13.

As shown, each of the load elements has associated strain gauges such as indicated at T1 and C1 for the column 10 and T2 and C2 for the column 11. Essentially, the strain gauges T1 and T2 measure tension strains due to Poisson's ratio while the strain gauges C1 and C2 are oriented to measure compression strains.

In order that an accurate indication of the load F be provided by signals from the various strain gauges for any position of the load on the platform, it is essential that the measured output sensitivity at position P1, when the load F is applied over the load element 10 and associated strain gauges T1 and C1 be as close as possible to the sensitivity when the load F is applied over the load element 11 and associated strain gauges T2 and C2 at position P2. Clearly if these sensitivities were different, any off-center loading of the applied force F on the platform 12 would result in different output readings. By assuring equal sensitivities, the proper proportional output signal will be provided regardless of the position of the applied load to the platform.

In the case of FIG. 1, and in accord with the method of the present invention, the sensitivities from the load elements and associated strain gauges are equalized by progressively physically removing material from the load element which is least sensitive to increase its physical elongations under given loads until the measured output sensitivity signal is the same when the load F is applied at P1 and then P2. In the embodiment of FIG. 1, this material removal is accomplished by providing axial holes such as indicated at 14 and 15 in the load elements or columns 10 and 11. The respective diameters of these holes are indicated at D1 and D2 and these diameters may be progressively varied relative to each other until the output sensitivity signal is the same for all positions P, P1 and P2 of F.

Figure 2:
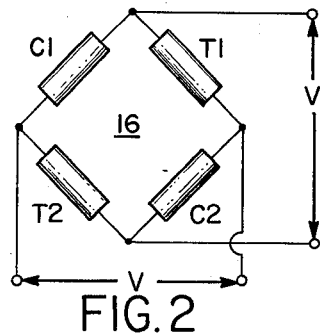
FIG. 2 illustrates the electrical bridge circuit incorporating the strain gauges in the drawing of FIG. 1.

The foregoing will be better understood by referring to FIG. 2 which illustrates a typical bridge circuit 16 incorporating the strain gauges T1, T2 and C1, C2 of FIG. 1. Diagonally opposite corners of the bridge are supplied with a voltage V and the output signal is taken from the other diagonally opposite corners of the bridge and is designated $v$. The strain gauges themselves will change in resistance when subjected to a strain as a consequence of an elongation or shortening of the portion of the load element to which they are affixed. The degree of elongation or shortening depends upon the applied force. In the case of the columns 10 and 11, it will be understood that the downward force will tend to compress the column to provide a change in the resistance of the strain gauge C1 while the resulting tendency of the column 10 to circumferentially expand under the compressive force F results in an elongation and thus a change in the resistance of the strain gauge T1.

Figure 3:
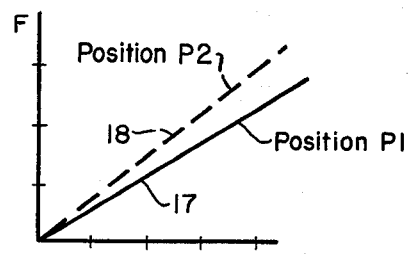
FIG. 3 illustrates output signals as a function of applied load or force for the load elements of FIG. 1.

Referring to FIG. 3 there is shown a plot of the output signal $v$ as a function of the applied load force F. The solid line 17 illustrates, by way of example, the output signal when the load F is applied at position P1 in FIG. 1 while the dashed line 18 indicates the output signal when the load F is applied at position P2.

It will be evident from FIG. 3 that the output 17 is of greater sensitivity than the output represented by the dashed line 18. This greater sensitivity is a consequence of the fact that there is a greater variation in the output signal $v$ for a given variation in the applied load F. In essence, the degree of sensitivity is determined by the slope of the plot of the output signal as a function of the force. The greater the slope, the less is the sensitivity.

In the example of FIG. 3, it has been assumed that element 2; that is, column 11 and the associated strain gauges T2 and C2 exhibit less sensitivity than element 1; that is, the element 2 is deemed the least sensitive of the two load elements and their associated strain gauges.

In accord with the method of the invention, a first step involved is to determine which of the load elements and associated strain gauges is the least sensitive and this determination can readily be made by comparing the average output signal as the load is shifted over one column and then over the other. As described in FIG. 3, it is evident from a comparison of the outputs 17 and 18 that element 2 is of lesser sensitivity than element 1.

The sensitivity of the least sensitive element 2 is increased, in accord with the next step of the method, by physically removing material to in effect increase the physical elongations or shortening under given loads until the measured sensitivity is the same for all load positions such as P, P1 and P2. In other words, by progressively increasing the diameter D2 of the axial bore 15 in the load element 2, there results in effect a greater shortening or compression reaction in the column 11 under a given force F and a greater elongation in a circumferential direction than is the case in the absence of the bore or hole. Accordingly, the output signals 17 and 18 will eventually coincide as material is progressively removed.

It should be understood that in the event the diameter D2 of the hole 15 in the element 2 should become too large such that the sensitivity of the element exceeds that of the element 1, it is possible to counteract this over-compensation by providing the hole 14 in the element 1. Thus, if element 2 becomes more sensitive than element 1, the sensitivity of element 1 can be increased by progressively increasing the diameter D1 of the hole 14. It is thus possible to equalize the sensitivities of the load elements by carefully and judiciously progressively removing material from the load elements as described.

Figure 4:
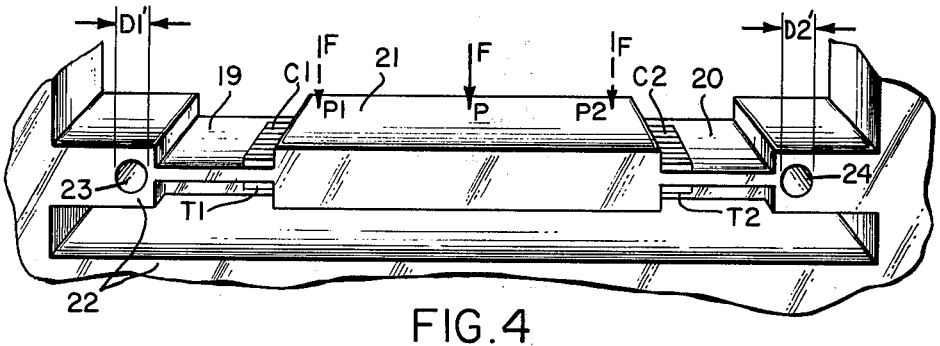
FIG. 4 is a simplified showing of bending web type load elements for supporting a platform to which the present invention is applicable.

Referring now to FIG. 4 there is shown another type of load element in the form of bending webs 19 and 20 supporting a platform 21 to a fixed frame 22. Strain gauges C1, T1 and C2, T2 are secured to the top and bottom sides of the bending webs 19 and 20 respectively adjacent to their securement point to the platform 21 as shown. It will be appreciated that when a load or weight F is placed on the platform 21, the strain gauges T1 and T2 will be placed in tension and the strain gauges C1 and C2 will be placed in compression as a consequence of bending of the webs 19 and 20 under the load.

The gauges in FIG. 4 are connected in a bridge such as described in FIG. 2 and again the sensitivities of the gauges associated with each of the webs can be compared as described in conjunction with FIG. 3 by shifting the load F from position P1 to position P2.

In order to equalize the sensitivities of the webs and associated strain gauges, suitable removal of material is accomplished by boring an opening adjacent to one of the web portions where it connects to the fixed frame to decrease effectively its bending at this point under a given load. Such a bore, by way of example, is illustrated at 23 and is shown of a given diameter D1'. A second bore 24 is also shown adjacent to the bending web 20 at the point it is secured to the frame 22 having a diameter D2'. In the case of FIG. 4 drilling a hole at one end of the web decreases the fixity which decreases the bending moment at that end of the element and increases it at the other end, where it connects to the frame 22 which essentially increases the sensitivity of the strain gauges in that web since these gauges are positioned adjacent the web connection point to the platform and thus are subjected to more strain under a given force F. While only one bore would ordinarily be necessary adjacent the least sensitive web and associated strain gauges, in the event that too much material is removed, the other element and associated strain gauges can be rendered more sensitive by provision of the second bore D2' as shown.

Thus, as in the case of the embodiment of FIG. 1, the output sensitivities of the load elements in the form of the webs 19 and 20 and associated strain gauges can be equalized by suitably adjusting the diameters D1' and D2' to increase the sensitivity of the least sensitive element.

In one sense, the removal of the material as described in FIG. 4 essentially changes the degree of fixity or the rigidity of securement of the load element at this location. It will be evident that the more material that is removed, the less the bending of the web itself at this point, since the bending force tends to distort the support where material is removed rather than the web itself. As a result the bending at the other point of securement at which the strain gauges are fixed must increase.

Figure 5:
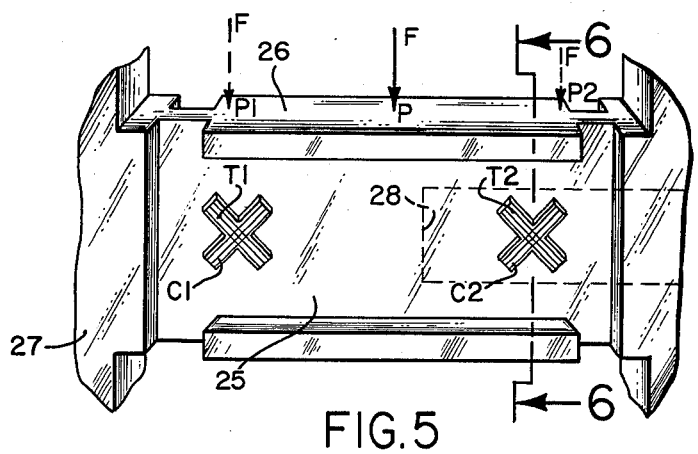
FIG. 5 illustrates shear type load element means with associated strain gauges and a platform to which the method of the invention is applicable; and, FIG. 6 is a cross section taken in the direction of the arrows 6—6 of FIG. 5.

FIG. 5 shows the application of the method of the present invention to a shear plate load element 25 supporting a platform 26 to a rigid frame 27. In this case, the strain gauges T1, C1 and T2, C2 are secured to the shear plate 25 at 45° angles relative to the direction of the downward force F and at right angles to each other, the elongation and shortening as a consequence of shear strain 25 causing variations in the resistances of the strain gauges.

As in the case of the other load elements described, to equalize the sensitivities, the output signal from the bridge circuit is measured for different positions of the load F and any differences in the sensitivities noted. In the case of the shear plate 25 in FIG. 7, the situation is similar to FIG. 1 in that the least sensitive element is noted. If it is assumed that the least sensitive signal is derived from the strain gauges T2 and C2, the portion of the shear plate 25 supporting these elements can be reduced in cross-section by suitable material removal to render the element and gauges T2 and C2 more sensitive.

In FIG. 5, this material removal takes the form of milling out part of the material in the shear plate 25 adjacent to the strain gauges T2 and C2 assuming these are the least sensitive.

Figure 6:
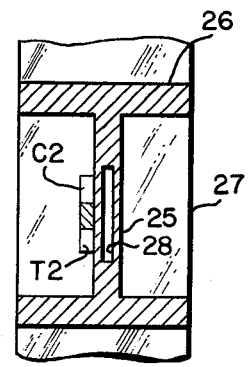

In the cross section of FIG. 6, the milled out cavity is shown at 28 and it will be evident that the cross sectional area of the load element in the form of the shear plate in the area of the strain gauges T2 and c2 has been decreased.

While not shown in FIG. 5, a similar milling operation could be effected adjacent to the strain gauges T1 and C1 in the event the strain gauges T2 and C2 and associated load element portion of the shear plate were rendered too sensitive so that equalization can readily be achieved.

Though the discussion has been directed toward the description of a scale utilizing two load elements, it is self-evident that the technique can be applied to platforms having more than two elements. For example, if four columns were provided at the corners of a square platform, each having a tension and compression strain gauge, the bridge of FIG. 2 would have two of the tension gauges on side-by-side columns in series in the arm containing T1, the other two tension gauges being in series in the opposite arm containing T2. The compression gauges similarly would be series connected in pairs to replace C1 and C2.

From the foregoing description, it will thus be evident that the present invention has provided a novel method of effecting equalization of strain gauge sensitivity all to the end that accurate output readings in platform-type weighing scales will be realized even under off-center loading conditions.

What is claimed is:

1. A method of mechanically equalizing the strain gauge sensitivity of at least two spaced load elements supporting a platform on a fixed reference frame so that the output signal from strain gauges secured to the elements and connected in a strain gauge bridge circuit is the same for different positions of an applied load on the platform, comprising the steps of:
  a. comparing the output signals from the bridge when a given load is first positioned off-center adjacent to one element and then shifted to an alternate position aajacent to another element; and,
  b. progressively, physically removing material from at least one of the elements to change the sensitivity until the measured output signal is the same for all positions of the applied load.

2. The method of claim 1, in which the progressive removal of material taking place at a given location changes the rigidity of the load element at said given location.

3. The method of claim 2, in which said load elements constitute columns, removal of material being accomplished by boring an axial hole into at least one of the columns and associated strain gauge exhibiting the least sensitivity, the diameter of said hole being increased until the sensitivities of the load elements are equalized.

4. The method of claim 2, in which said load elements constitute bending webs, the strain guages being secured to opposite sides of the webs where they connect to the platform, removal of material being accomplished by boring an opening into the fixed frame adjacent to the end of that web connected thereto exhibiting the least sensitivity to decrease the fixity of the web at said end and thereby increasing the bending of the web where it connects to the platform, the diameter of the bore being increased until the sensitivities of the webs are equal.

5. The method of claim 2, in which said load elements constitute portions of a shear plate, removal of material being accomplished by milling away material of the shear plate adjacent to the plate area to which the strain gauges exhibiting least sensitivity are affixed.

* * * * *